US012775282B2

(12) United States Patent
Yoshikawa

(10) Patent No.: US 12,775,282 B2
(45) Date of Patent: Oct. 27, 2026

(54) AUTONOMOUS TRAVELING DEVICE AND AUTONOMOUS TRAVELING DEVICE CONTROL METHOD

(71) Applicant: NIDEC CORPORATION, Kyoto (JP)

(72) Inventor: Tomoki Yoshikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 229 days.

(21) Appl. No.: 18/692,325

(22) PCT Filed: Jun. 10, 2022

(86) PCT No.: PCT/JP2022/023534

§ 371 (c)(1),
(2) Date: Sep. 12, 2024

(87) PCT Pub. No.: WO2023/042500

PCT Pub. Date: Mar. 23, 2023

(65) Prior Publication Data

US 2025/0060756 A1 Feb. 20, 2025

(30) Foreign Application Priority Data

Sep. 15, 2021 (JP) ................................ 2021-150062

(51) Int. Cl.

| | |
|---|---|
| ***G05D 1/622*** | (2024.01) |
| ***G05D 1/246*** | (2024.01) |
| ***G05D 105/20*** | (2024.01) |

(52) U.S. Cl.

CPC ............ *G05D 1/622* (2024.01); *G05D 1/246* (2024.01); *G05D 2105/20* (2024.01)

(58) Field of Classification Search

CPC .... G05D 1/0088; G05D 1/024; G05D 1/0251; G05D 1/0255; G05D 1/0272;

(Continued)

(56) References Cited

U.S. PATENT DOCUMENTS

| | | |
|---|---|---|
| 5,652,489 A | 7/1997 | Kawakami |
| 7,441,298 B2 | 10/2008 | Svendsen et al. |

(Continued)

FOREIGN PATENT DOCUMENTS

| | | | |
|---|---|---|---|
| CN | 109032148 A | 12/2018 | |
| CN | 111332286 B * | 7/2025 | ........... G05D 1/0088 |

(Continued)

OTHER PUBLICATIONS

International Search Report in PCT/JP2022/023534, mailed Aug. 9, 2022, 4pp.

*Primary Examiner* — Babar Sarwar
(74) *Attorney, Agent, or Firm* — HAUPTMAN HAM, LLP

(57) ABSTRACT

One aspect of an autonomous traveling device includes: a recognition unit that recognizes an obstacle for each of right and left regions sandwiching a body of the autonomous traveling device; a direction calculation unit that calculates a direction along the obstacle for each of the right and left regions; and a deviation control unit that causes the body to move away from the obstacle by combining a rotational movement that changes orientation of the body toward an intermediate direction of each of the directions calculated by the direction calculation unit and a backward movement that causes the body to move backward.

14 Claims, 11 Drawing Sheets

(58) Field of Classification Search
CPC .... G05D 1/0274; G05D 1/0223; G05D 1/246; G05D 1/622; G05D 1/633; G05D 1/639; G05D 2105/20; G05D 2105/28; G05D 2107/70; G05D 2109/10; B60W 60/0011
See application file for complete search history.

(56) References Cited

U.S. PATENT DOCUMENTS

| | | | | |
|---|---|---|---|---|
| 8,374,721 | B2 | 2/2013 | Halloran et al. | |
| 8,380,350 | B2 | 2/2013 | Ozick et al. | |
| 8,584,305 | B2 | 11/2013 | Won et al. | |
| 8,584,307 | B2 | 11/2013 | Won et al. | |
| 8,600,553 | B2 | 12/2013 | Svendsen et al. | |
| 8,606,401 | B2 | 12/2013 | Ozick et al. | |
| 8,661,605 | B2 | 3/2014 | Svendsen et al. | |
| 8,761,931 | B2 | 6/2014 | Halloran et al. | |
| 8,950,038 | B2 | 2/2015 | Won et al. | |
| 8,954,192 | B2 | 2/2015 | Ozick et al. | |
| 8,978,196 | B2 | 3/2015 | Svendsen et al. | |
| 9,020,682 | B2 | 4/2015 | Shitamoto et al. | |
| 9,119,512 | B2 | 9/2015 | Martins, Jr. et al. | |
| 9,144,360 | B2 | 9/2015 | Ozick et al. | |
| 9,149,170 | B2 | 10/2015 | Ozick et al. | |
| 9,320,398 | B2 | 4/2016 | Hussey et al. | |
| 9,392,920 | B2 | 7/2016 | Halloran et al. | |
| 9,599,990 | B2 | 3/2017 | Halloran et al. | |
| 9,901,236 | B2 | 2/2018 | Halloran et al. | |
| 10,070,763 | B2 | 9/2018 | Won et al. | |
| 10,182,695 | B2 | 1/2019 | Halloran et al. | |
| 10,524,629 | B2 | 1/2020 | Won et al. | |
| 10,980,387 | B2 | 4/2021 | Shitamoto et al. | |
| 11,737,632 | B2 | 8/2023 | Won et al. | |
| 11,914,394 | B2 * | 2/2024 | Thode | B60W 30/095 |
| 2011/0077802 | A1 | 3/2011 | Halloran et al. | |
| 2013/0166134 | A1 * | 6/2013 | Shitamoto | B60W 60/0011 701/26 |
| 2016/0075024 | A1 | 3/2016 | Ozick et al. | |
| 2017/0120803 | A1 * | 5/2017 | Kentley | B60L 3/0007 |
| 2017/0120804 | A1 * | 5/2017 | Kentley | B60N 2/42 |
| 2017/0169710 | A1 * | 6/2017 | Beaurepaire | B60W 30/18163 |
| 2018/0141570 | A1 * | 5/2018 | Kimura | B60Q 3/731 |
| 2020/0183404 | A1 * | 6/2020 | Lin | A47L 11/4011 |
| 2021/0107477 | A1 * | 4/2021 | Kim | B60W 30/0956 |
| 2021/0284143 | A1 * | 9/2021 | Cohen | G05D 1/024 |
| 2022/0001859 | A1 * | 1/2022 | Park | B60W 60/0011 |
| 2022/0097727 | A1 * | 3/2022 | Reshef | G06N 20/00 |
| 2022/0161787 | A1 * | 5/2022 | Kinoshita | B60W 10/18 |
| 2022/0254166 | A1 * | 8/2022 | Sasaki | B60W 60/0015 |

FOREIGN PATENT DOCUMENTS

| | | | | | |
|---|---|---|---|---|---|
| EP | 1963940 | B1 | | 9/2009 | |
| EP | 3342667 | A1 | * | 7/2018 | B60W 30/095 |
| JP | H02-115906 | A | | 4/1990 | |
| JP | H10-078823 | A | | 3/1998 | |
| JP | H10-207546 | A | | 8/1998 | |
| JP | 3868915 | B2 | * | 1/2007 | |
| JP | 2012183875 | A | * | 9/2012 | F21S 41/698 |
| JP | 2012202961 | A | * | 10/2012 | |
| JP | 5510081 | B2 | | 6/2014 | |
| JP | 6693291 | B2 | | 5/2020 | |
| JP | 2022504430 | A | * | 1/2022 | G05D 1/65 |
| KR | 20190091366 | A | * | 8/2019 | G06Q 10/00 |
| KR | 102360817 | B1 | * | 2/2022 | B60W 60/00272 |
| KR | 20220032912 | A | * | 3/2022 | B60W 30/18159 |
| WO | WO-2017110703 | A1 | * | 6/2017 | G08G 1/166 |
| WO | WO-2021152650 | A1 | * | 8/2021 | G08G 1/167 |

* cited by examiner

AUTONOMOUS TRAVELING DEVICE AND AUTONOMOUS TRAVELING DEVICE CONTROL METHOD

RELATED APPLICATIONS

The present application is a National Phase of International Application No. PCT/JP2022/023534 filed Jun. 10, 2022, which claims priority to Japanese Application No. 2021-150062, filed Sep. 15, 2021.

FIELD

The present invention relates to an autonomous traveling device and an autonomous traveling device control method.

BACKGROUND

Conventionally, there are autonomous traveling devices known to travel autonomously to destinations based on map information and the like.

Autonomous traveling devices are also proposed to be used at home, in public places, and the like other than to be used in factories and the like where the general public is not expected to enter and leave.

Autonomous traveling devices are prohibited from traveling in the vicinity of obstacles set in advance on a map or the like and obstacles detected by sensors. Therefore, such an autonomous traveling device calculates a route to avoid a travel prohibited area and, when an obstacle such as a fallen object or a person is suddenly detected, comes to be in a standby state and waits for the obstacle to move away. However, the autonomous traveling device is not possible to travel only by waiting if the obstacle does not move away, so a return (recovery) operation is required for moving away from the obstacle to a position where it can travel autonomously.

For example, Patent Literature 1 proposes a traveling control method that, when an emergency obstacle is identified, causes a transport vehicle to move backward to the nearest grid point and to perform an avoidance operation at a position not colliding with the obstacle.

CITATION LIST

Patent Literature

Patent Literature 1: Japanese Patent Application Laid-open No. H2-115906

SUMMARY

Technical Problem

However, with the return operation only with a backward movement, recovery may not be achieved or the time and distance till the recovery may increase, depending on the positional relationship with the obstacle and the surrounding environment such as a curved pathway.

It is therefore an object of the present invention to be able to promptly return to autonomous traveling. Note here that "promptly" means at least one of the time and distance is short.

Solution to Problem

One aspect of an autonomous traveling device according to the present invention includes: a recognition unit that recognizes an obstacle for each of right and left regions sandwiching a body of the autonomous traveling device; a direction calculation unit that calculates a direction along the obstacle for each of the right and left regions; and a deviation control unit that causes the body to move away from the obstacle by combining a rotational movement that changes orientation of the body toward an intermediate direction of each of the directions calculated by the direction calculation unit and a backward movement that causes the body to move backward.

Furthermore, an autonomous traveling device control method according to the present invention includes: a recognition step of recognizing an obstacle for each of right and left regions sandwiching a body of the autonomous traveling device; a direction calculation step of calculating a direction along the obstacle for each of the right and left regions; and a deviation control step of causing the body to move away from the obstacle by combining a rotational movement that changes orientation of the body toward an intermediate direction of each of the directions calculated by the direction calculation unit and a backward movement that causes the body to move backward.

Advantageous Effects of Invention

According to the present invention, it is possible to promptly return to autonomous traveling.

DESCRIPTION OF EMBODIMENTS

Figure 1:
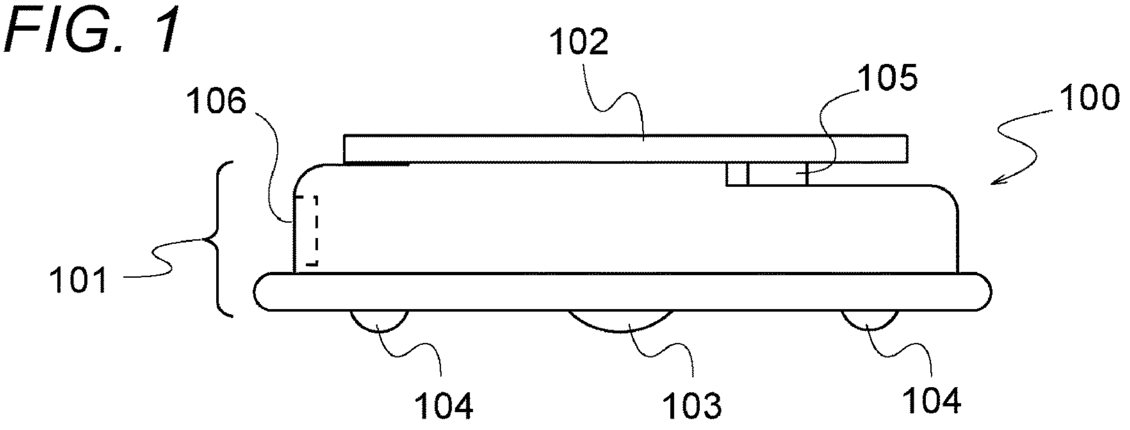
FIG. 1 is a side view illustrating an appearance of an autonomous traveling device according to an embodiment.

Hereinafter, an embodiment of an autonomous traveling device and an autonomous traveling device control method according to the present disclosure will be described in detail with reference to the accompanying drawings. However, in order to avoid unnecessary redundancy in the following description and to facilitate the understanding of those skilled in the art, more detailed explanations than necessary may be omitted. For example, detailed explanations of already well-known matters and duplicate explanations for substantially same configurations may be omitted. Furthermore, elements illustrated in the drawings described earlier may be referred to as appropriate in the explanations of latter drawings.

Figure 2:
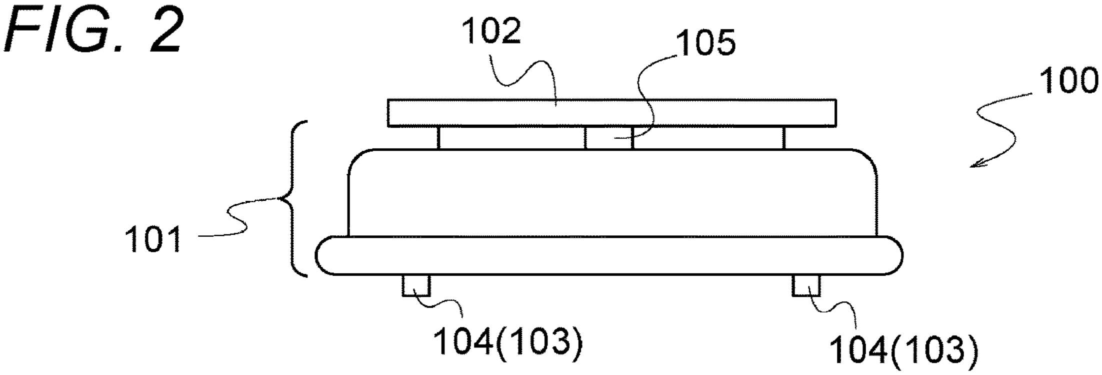
FIG. 2 is a front elevational view illustrating the appearance of the autonomous traveling device according to the present embodiment.
Figure 3:
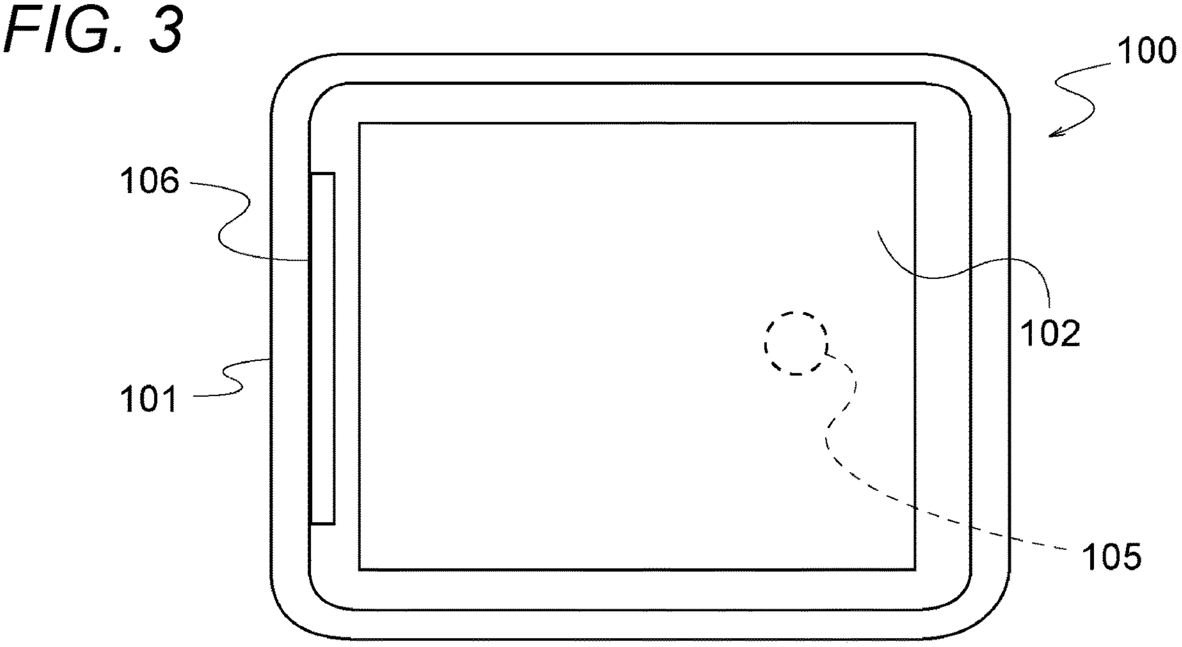
FIG. 3 is a top view illustrating the appearance of the autonomous traveling device according to the present embodiment.

FIG. 1 to FIG. 3 are diagrams illustrating the appearance of the autonomous traveling device according to the present embodiment. FIG. 1 illustrates a side view, FIG. 2 illustrates a front elevational view, and FIG. 3 illustrates a top view.

An autonomous traveling device 100 according to the present embodiment is a device called an autonomous mobile robot (AMR) that transports materials and the like in factories, public places, and the like, for example.

The autonomous traveling device 100 includes a body unit 101, a loading platform 102, wheels 103, casters 104, a front sensor 105, and a rear sensor 106.

The body unit 101 has a computer for control, a power supply for driving, and the like built therein. The shape of the body unit 101 viewed from the top-and-bottom direction is a rectangle-like shape. Note that "rectangle-like shape" includes a rectangle, a rectangle with chamfered corners, and a rectangle with rounded corners. In the following description, the position of the front sensor 105 is illustrated as a mark for the front and rear of the autonomous traveling device 100.

The loading platform 102 is loaded with loads such as materials. While there may be cases where the size of the load exceeds the size of the loading platform 102 or the body unit 101, a case where the load is within the size of the loading platform 102 will be described as an example for the sake of explanation.

The wheels 103 are provided at two sections on the right and left sides of the body unit 101 as an example, and are rotationally driven by a motor in the body unit 101. The right and left wheels 103 can be driven independently, and the autonomous traveling device 100 can move forward, backward, rotate on the spot, and turn (so-called curving movement) by driving the right and left wheels 103.

The casters 104 are each provided at the four corners of the body unit 101, for example, to support the body unit 101 so as not to tilt. The casters 104 have no driving force, which roll in accordance with the movement of the body unit 101 and change the directions in accordance with the movement of the body unit 101.

The front sensor 105 detects obstacles and the like over a wide range in front of and the right and left sides of the body unit 101. For example, a 2D-LiDER is used as the front sensor 105.

The rear sensor 106 detects obstacles and the like behind the body unit 101. An infrared sensor or the like, for example, is used as the rear sensor 106, and detection is performed by a plurality of sensor elements installed along the rear outer face of the body unit 101, for example.

Figure 4:
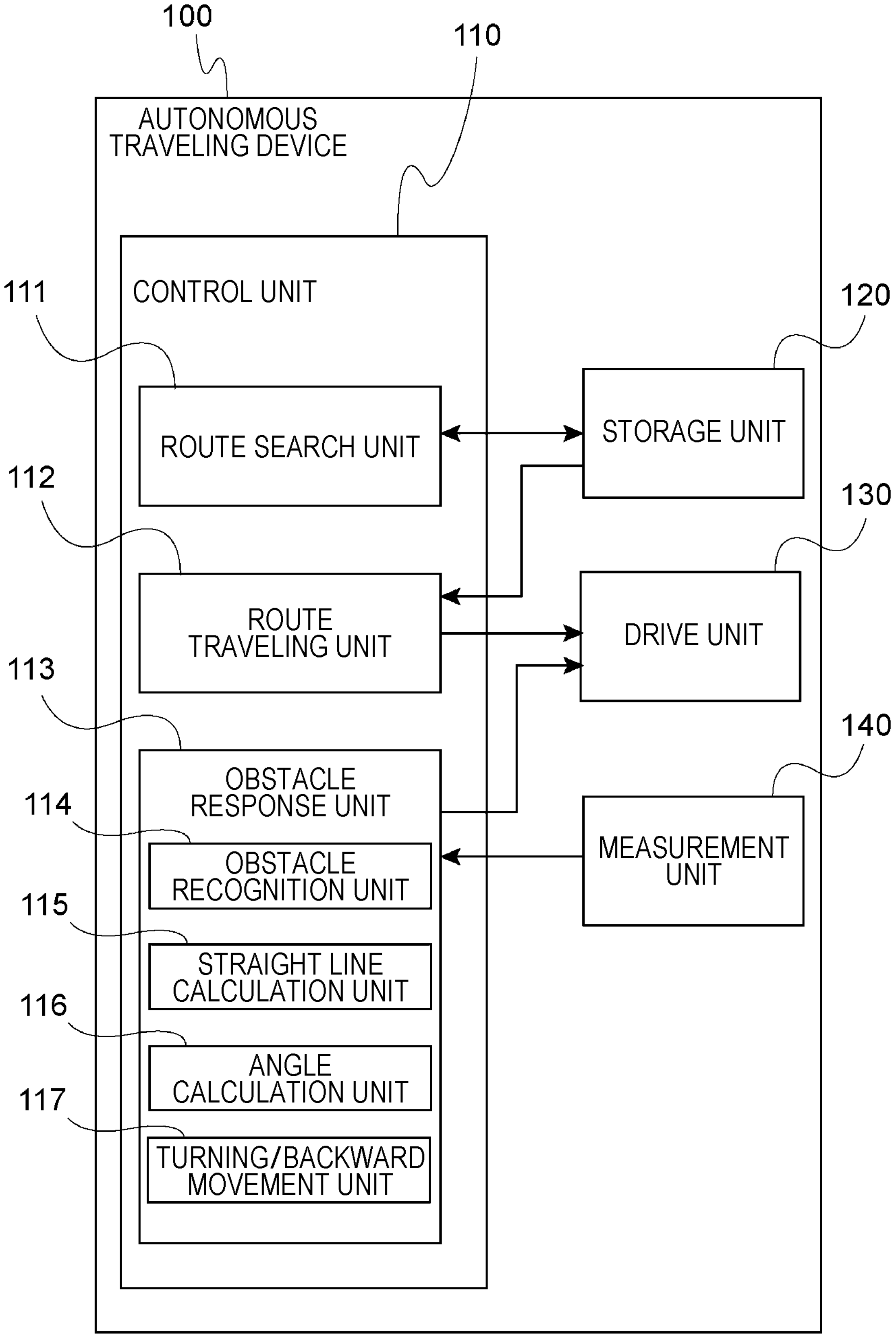
FIG. 4 is a functional block diagram illustrating a functional configuration of the autonomous traveling device according to the present embodiment.

FIG. 4 is a functional block diagram illustrating the functional configuration of the autonomous traveling device 100 according to the present embodiment.

The autonomous traveling device 100 includes a control unit 110, a storage unit 120, a drive unit 130, and a measurement unit 140.

The control unit 110 is a function carried out by a computer built into the body unit 101, which controls the entire autonomous traveling device 100.

The storage unit 120 stores map information of the regions where the autonomous traveling device 100 travels and the routes to be traveled in the regions.

The drive unit 130 is a function carried out by the power supply and motor built into the body unit 101 as well as the wheels 103 described above. The autonomous traveling device 100 travels when the drive unit 130 drives under the control of the control unit 110.

The measurement unit 140 is a function carried out by the above-described front sensor 105 and rear sensor 106.

The control unit 110 includes a route search unit 111, a route traveling unit 112, and an obstacle response unit 113.

The route search unit 111 searches for and determines a route to the destination based on the map information stored in the storage unit 120, and stores the determined route in the storage unit 120. In the present embodiment, the route search unit 111 searches for routes that can reach the destination without moving backward while avoiding obstacles indicated in the map information as a route, and determines the route that reaches the destination in the shortest time.

The route traveling unit 112 controls the drive unit 130 such that the autonomous traveling device 100 travels along the route stored in the storage unit 120.

The obstacle response unit 113 deals with obstacles detected by the measurement unit 140. The autonomous traveling device 100 does not move backward while traveling under control of the route traveling unit 112, and the obstacle response unit 113 checks safety by the measurement unit 140. The obstacle response unit 113 may modify the traveling direction so as not to get too close to the detected obstacles. When an obstacle not indicated in the map information, such as a fallen object or a person approaching, is suddenly detected at a close distance, the obstacle response unit 113 controls the drive unit 130 to cause the autonomous traveling device 100 to wait and recover. The details of the obstacle response unit 113 will be described later.

Figure 5:
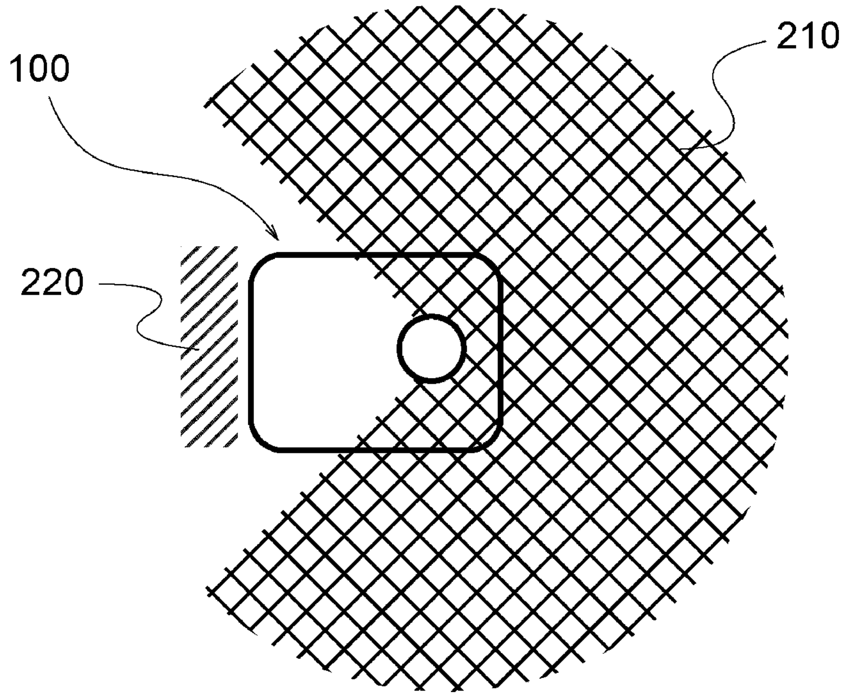
FIG. 5 is a diagram illustrating a measurement range of the autonomous traveling device.

FIG. 5 is a diagram illustrating a measurement range of the autonomous traveling device 100.

As described above, the autonomous traveling device 100 includes, for example, a 2D-LiDER as the front sensor 105, and a measurement range 210 of the front sensor 105 extends to a 270° viewing angle and a positioning distance of 30 meters. The front sensor 105 can measure the direction and distance for the objects (that is, obstacles) within the measurement range 210.

Furthermore, the autonomous traveling device 100 includes an infrared sensor, for example, as the rear sensor 106, and a measurement range 220 of the rear sensor 106 is about 0.2 to 1 m in the positioning distance. The rear sensor 106 can detect the presence of objects (that is, obstacles) in the measurement range 220.

Figure 6:
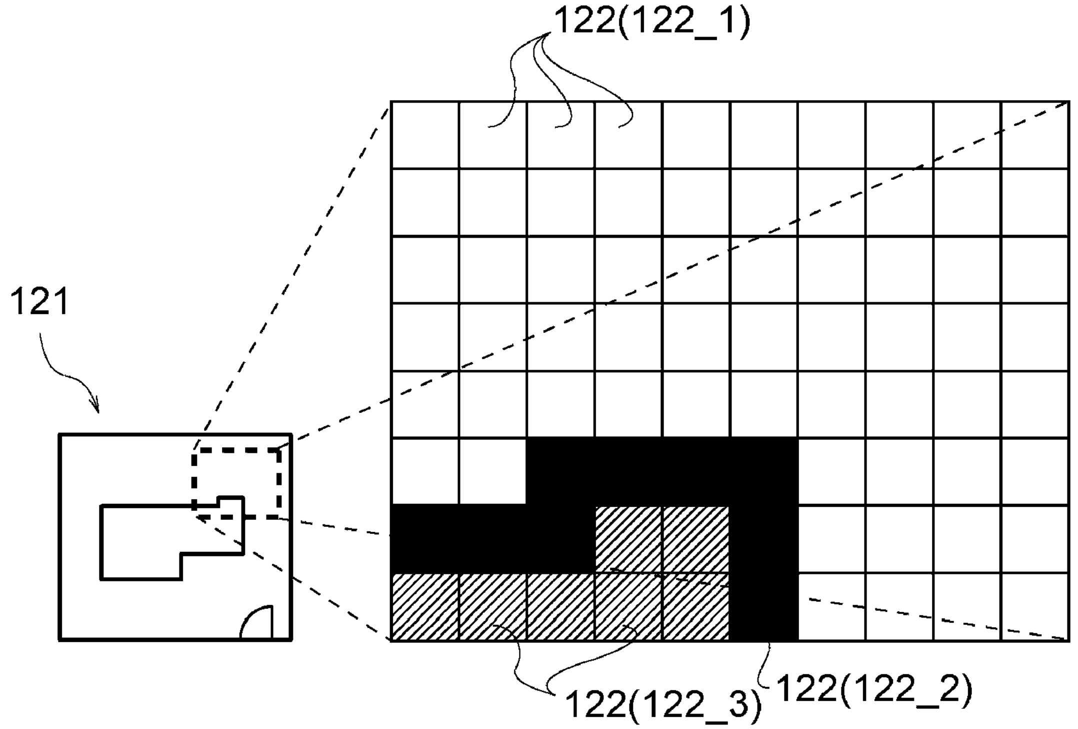
FIG. 6 is a diagram illustrating an example of map information stored in a storage unit.

FIG. 6 is a diagram illustrating an example of the map information stored in the storage unit 120.

Map information 121 represents a map as a set of unit parcels 122 that are the traveling area of the autonomous traveling device 100 sectioned into a grid pattern. Three kinds of information, for example, are given to each of the unit parcels 122.

That is, a value "100", for example, is given to a unit parcel 122_2 with an object, a value "0", for example, is given to a unit parcel 122_1 without any object, and a value "−1", for example, is given to an unknown unit parcel 122_3.

The autonomous traveling device 100 searches for and determines a travel route based on such map information 121, and travels autonomously by following the determined route.

Figure 7:
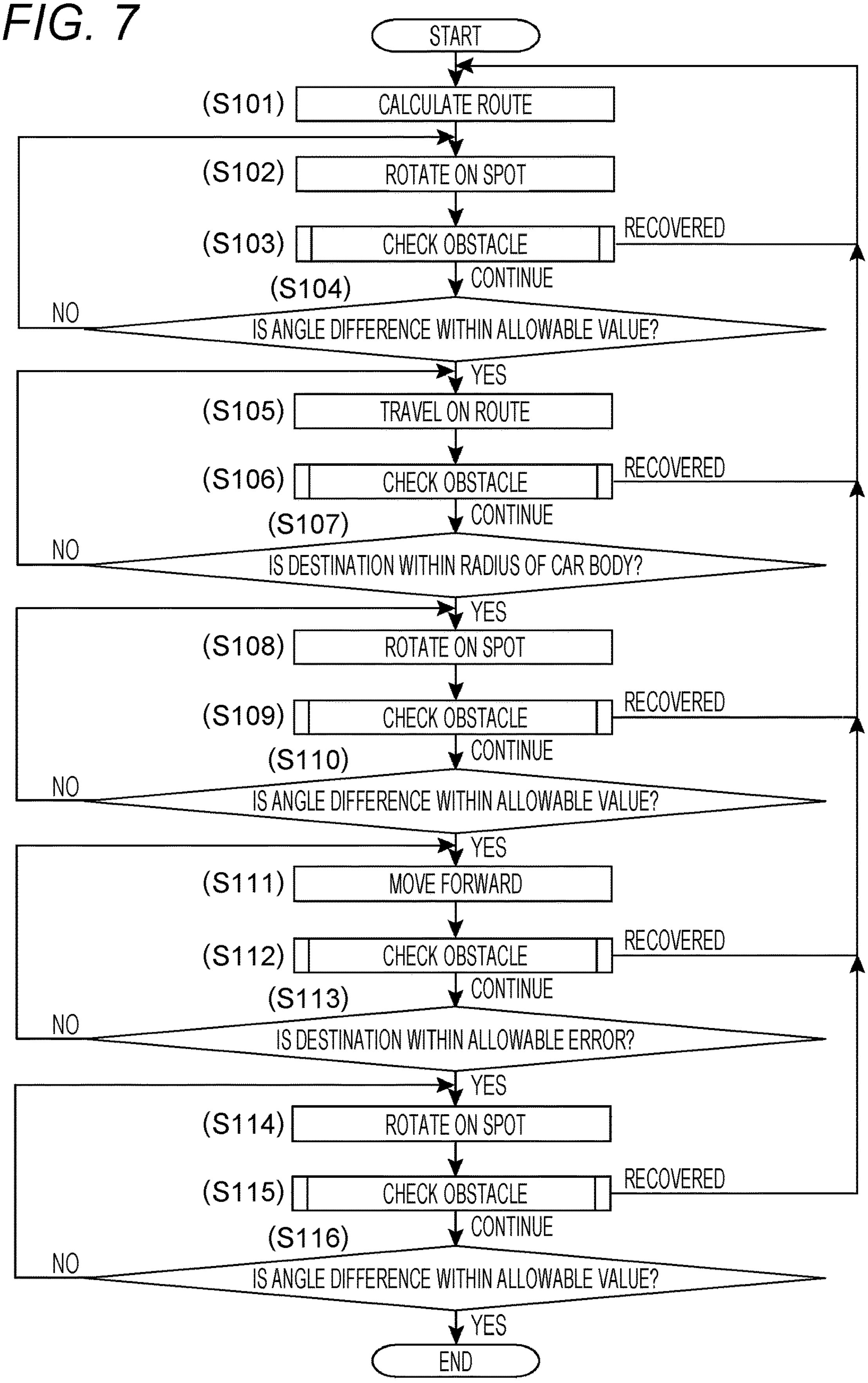
FIG. 7 is a flowchart illustrating autonomous traveling operation processing of the autonomous traveling device.

FIG. 7 is a flowchart illustrating autonomous traveling operation processing of the autonomous traveling device 100.

When starting autonomous traveling, the autonomous traveling device 100 searches for and determines the traveling route from the current location to the destination by the route search unit 111 of the control unit 110 (step S101). Note that the route search unit 111 may, for example, periodically redo the route search during autonomous traveling of the autonomous traveling device 100. However, for the sake of explanation, it is assumed hereinafter to execute an operation in which the route is searched and determined first, and then the determined route is used for traveling.

After step S101, the autonomous traveling device 100 performs an operation for starting movement by controlling the drive unit 130 by the route traveling unit 112 of the control unit 110. Specifically, first, rotation on the spot is performed (step S102), and obstacle check processing by the obstacle response unit 113 is performed during the rotation (step S103). Then, when the angle difference between the orientation of the autonomous traveling device 100 and the route is not within an allowable value (NO at step S104), the processing returns to step S102 to continue the rotation on the spot.

When the angle difference between the orientation of the autonomous traveling device 100 and the route comes to be within the allowable value (YES at step S104), the autonomous traveling device 100 performs an on-the-move operation by controlling the drive unit 130 by the route traveling unit 112 of the control unit 110. In the on-the-move operation, the autonomous traveling device 100 travels along the route (step S105), and the obstacle check processing by the obstacle response unit 113 is performed during the travel (step S106). When the distance between the autonomous traveling device 100 and the destination is not within the radius of the car body (NO at step S107), the processing returns to step S105 to continue traveling.

When the distance between the autonomous traveling device 100 and the destination comes to be within the radius of the car body (YES at step S107), the autonomous traveling device 100 performs an operation for ending the movement by controlling the drive unit 130 by the route traveling unit 112 of the control unit 110. Specifically, first, rotation on the spot is performed (step S108), and the obstacle check processing by the obstacle response unit 113 is performed during the rotation (step S109). Then, when the angle difference between the orientation of the autonomous traveling device 100 and the direction of the destination is not within an allowable value (NO at step S110), the processing returns to step S108 to continue the rotation on the spot.

When the angle difference between the orientation of the autonomous traveling device 100 and the direction of the destination comes to be within the allowable value (YES at step S110), the autonomous traveling device 100 starts to move forward (step S111), and performs the obstacle check processing by the obstacle response unit 113 while moving forward (step S112). Then, when the distance between the autonomous traveling device 100 and the destination is not within an allowable error (NO at step S113), the processing returns to step S111 to continue to move forward.

When the distance between the autonomous traveling device 100 and the destination comes to be within the allowable error (YES at step S113), the autonomous traveling device 100 rotates on the spot (step S114), and performs the obstacle check processing by the obstacle response unit 113 during the rotation (step S115). Then, when the angle difference between the orientation of the autonomous traveling device 100 and the orientation when stopped at the destination is not within an allowable value (NO at step S116), the processing returns to step S114 to continue the rotation on the spot. When the angle difference between the orientation of the autonomous traveling device 100 and the orientation when stopped at the destination comes to be within the allowable value (YES at step S116), the autonomous traveling device 100 ends the autonomous traveling operation processing.

In the obstacle check processing at steps S103, S106, S109, S112, and S115, the operation of the autonomous traveling device 100 simply continues when there are no obstacles. When there is an obstacle, recovery for being away from the obstacle is performed and processing returns to step S101.

The concept of the operation for recovery will be described below.

Figure 8:
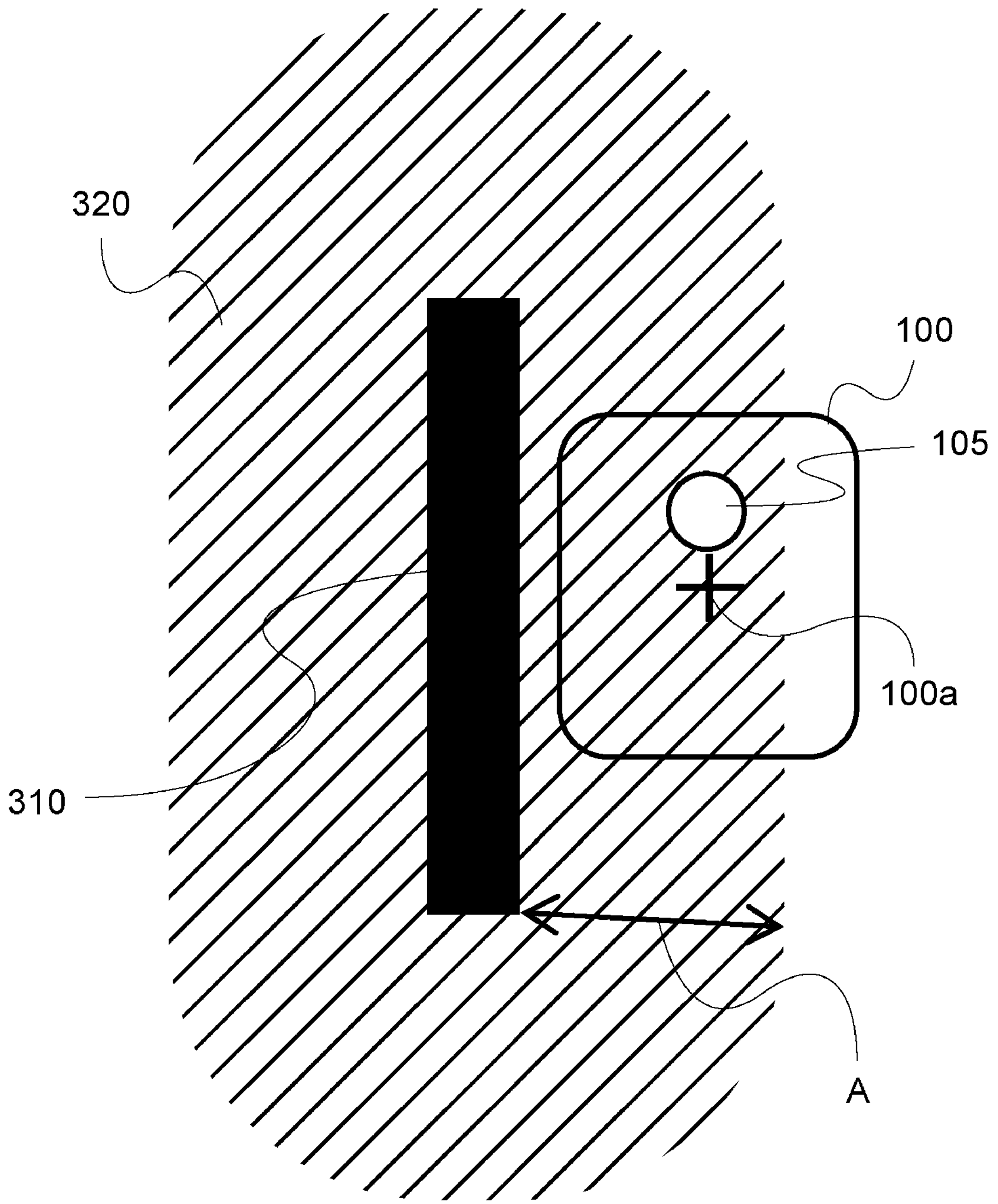
FIG. 8 is a diagram illustrating an autonomous inoperable condition that requires recovery.
Figure 9:
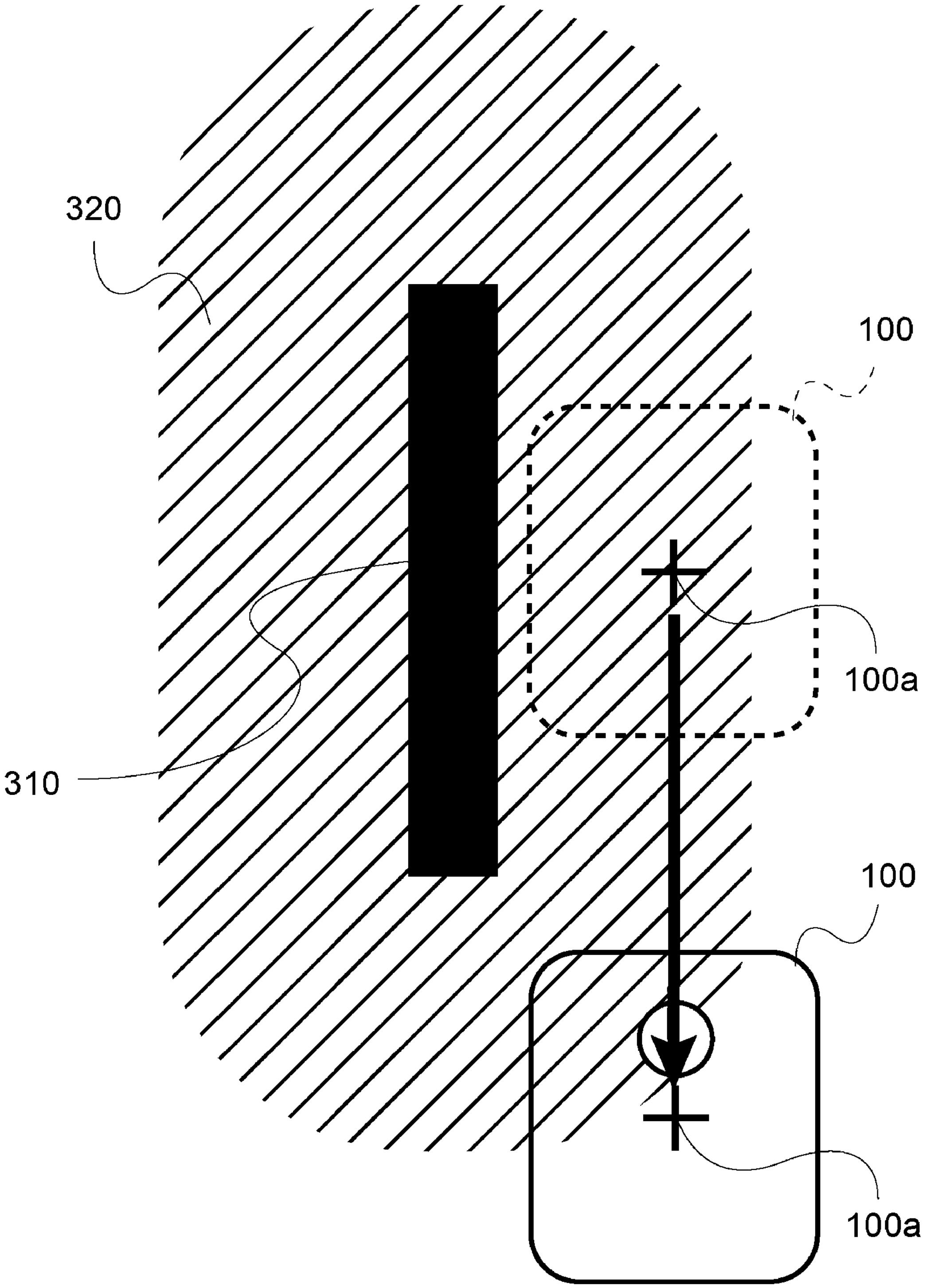
FIG. 9 is a diagram illustrating recovery performed by a linear backward movement.
Figure 10:
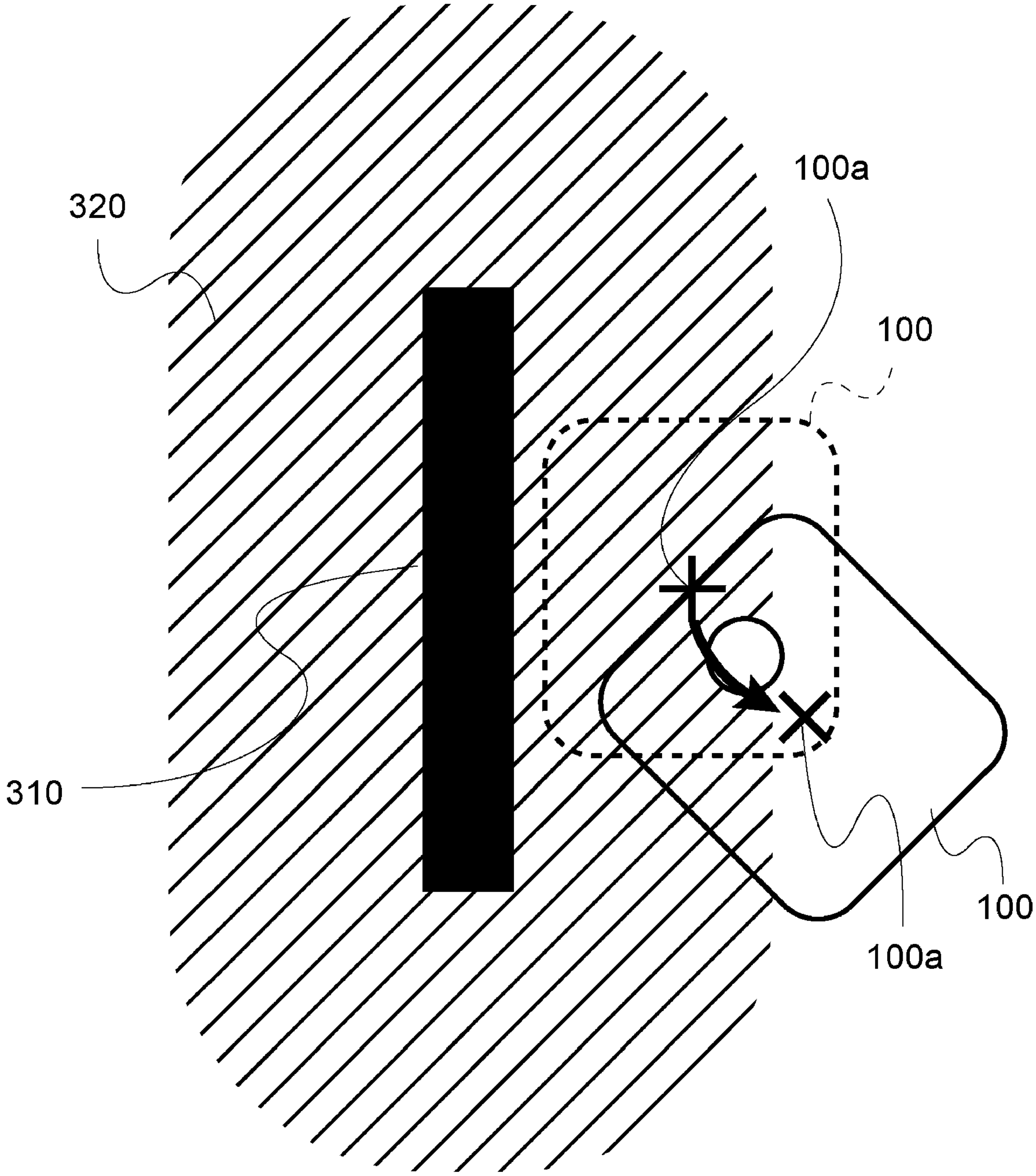
FIG. 10 is a diagram illustrating recovery performed by turning.

FIG. 8 to FIG. 10 are diagrams illustrating the concept of the operation for recovery. FIG. 8 illustrates an autonomous inoperable condition that requires recovery, FIG. 9 illustrates recovery performed by a linear backward movement, and FIG. 10 illustrates recovery performed by turning.

The autonomous traveling device 100 travels by searching for a route that avoids a travel prohibited area 320 within a set distance A from an obstacle 310. However, the autonomous traveling device 100 may enter the travel prohibited area 320 in a case where the obstacle 310 is a fallen object, for example. For the sake of calculation, the position of a car body center **100*a* is used as the position of the autonomous traveling device 100**.

When the car body center **100*a* enters the travel prohibited area 320, the autonomous traveling device 100 becomes unable to perform normal autonomous traveling by following the travel route. Thus, the autonomous traveling device 100 stops and waits for the obstacle 310 to be eliminated. Then, when the obstacle 310 is not eliminated even after waiting, the autonomous traveling device 100 performs recovery to move away from the obstacle 310 and leaves the travel prohibited area 320**.

As illustrated in FIG. 9, the recovery of the autonomous traveling device 100 by moving backward linearly allows the autonomous traveling device 100 to leave the travel prohibited area 320, and the autonomous traveling device 100 after leaving the travel prohibited area 320 can resume autonomous traveling. However, the recovery of the autonomous traveling device 100 by moving backward linearly may require a long-distance (or a long time) backward movement along the obstacle 310, for example, depending on the positional relationship with respect to the obstacle 310.

In contrast, as illustrated in FIG. 10, recovery by turning the autonomous traveling device 100 allows the autonomous traveling device 100 to promptly leave the travel prohibited area 320. Note here that "promptly" means at least one of the time and distance is short. Thus, since recovery by turning is superior to recovery by a linear backward movement, the autonomous traveling device 100 according to the present embodiment employs recovery by turning.

Figure 11:
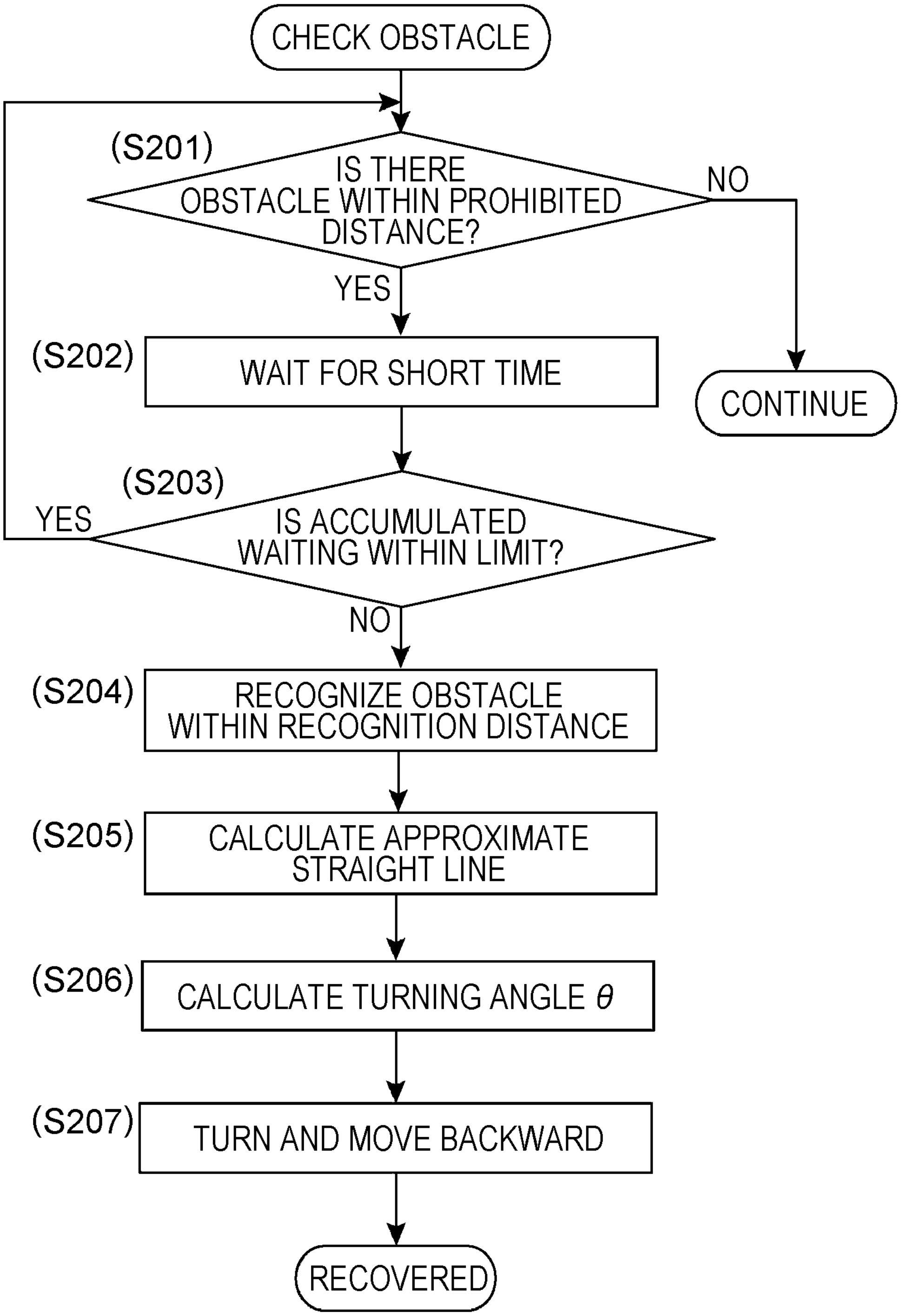
FIG. 11 is a flowchart illustrating processing contents of obstacle check processing.

FIG. 11 is a flowchart illustrating processing contents of the obstacle check processing.

In the obstacle check processing, first, objects in the surroundings of the autonomous traveling device 100 are measured by the measurement unit 140 controlled by the obstacle response unit 113 to determine the presence of obstacles within the set distance A described above (that is, whether the autonomous traveling device 100 has entered the travel prohibited area 320) (step S201). Then, when there are no obstacles within the set distance A (NO at step S201), autonomous traveling is continued.

On the other hand, when there is an obstacle within the set distance A (YES at step S201), the drive unit 130 is controlled by the obstacle response unit 113, and the autonomous traveling device 100 stops and waits for a short time (step S202). Then, when the accumulated time of waiting is within a limit determined in advance (YES at step S203), the processing returns to step S201 to continue recognition of obstacles and waiting. When there are no more obstacles before the accumulated time of waiting exceeds the limit (NO at step S201), the processing returns to "continue" indicated in FIG. 7, and autonomous traveling of the autonomous traveling device 100 by following the route is resumed under the control of the route traveling unit 112.

As a result of continuing recognition of obstacles and waiting, when the accumulated time of waiting exceeds the limit (NO at step S203), recovery by turning is executed at the following steps S204 to S207.

Figure 12:
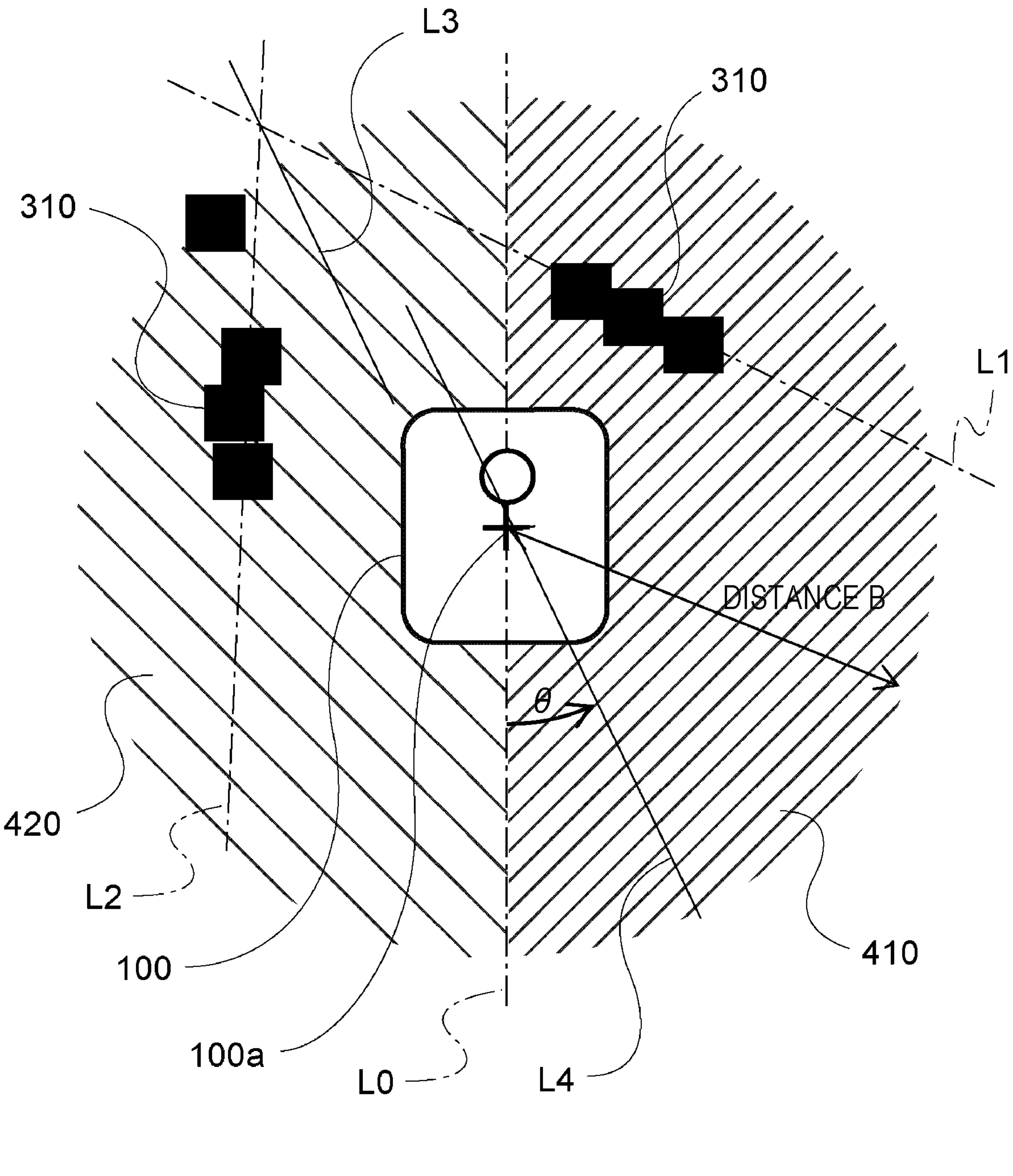
FIG. 12 is a diagram illustrating an example of recovery performed by turning.

FIG. 12 is a diagram illustrating an example of recovery performed by turning.

Hereinafter, recovery processing operations will be described by referring to FIG. 4, FIG. 11, and FIG. 12.

At step S204, measurement by the measurement unit 140 is performed under the control of an obstacle recognition unit 114, and the distance and direction of the obstacle 310 are measured for each of a right region 410 and a left region 420 located on the right and left sides of the autonomous traveling device 100. In other word, the obstacle recognition unit 114 corresponds to an example of a recognition unit, and recognizes the obstacle 310 for each of the right and left regions (that is, the right region 410 and the left region 420) sandwiching the body unit 101 of the autonomous traveling device 100. Furthermore, step S204 corresponds to an example of a recognition step in the present invention.

The right region 410 and the left region 420 are regions within a certain recognition distance B from the car body center 100*a* of the autonomous traveling device 100. The same distance as the set distance A that defines the travel prohibited area 320 described above may be used as the recognition distance B, or a distance greater than the set distance A may be used to provide a margin.

At step S204, the obstacle recognition unit 114 measures the obstacle 310 by the measurement unit 140 and also recognizes the obstacle 310 in the map information 121 in the storage unit 120. In other words, the obstacle recognition unit 114 according to the present embodiment recognizes the obstacle 310 by the measurement unit 140 and also by the map information 121. In the map information 121, obstacles 310 such as steps and grooves that are difficult to be measured by the measurement unit 140 may be illustrated. In addition, virtual obstacles 310 that do not actually exist may be set in the map information 121 in the form of no-entry areas or the like, for example, to limit the traveling places of the autonomous traveling device 100. By having the obstacle recognition unit 114 also recognize the obstacles 310 also in the map information 121, it is possible to deal with such cases.

After the obstacles 310 are recognized at step S204, a straight line calculation unit 115 at step S205 calculates approximate straight lines L1 and L2 for the obstacle 310 that is closer to the autonomous traveling device 100 for each of the right region 410 and left region 420. In other words, the straight line calculation unit 115 corresponds to an example of a direction calculation unit, and calculates the direction along the obstacles 310 for each of the right and left regions. Furthermore, step S205 corresponds to an example of a direction calculation step in the present invention.

Next, at step S206, an angle calculation unit 116 calculates a bisector L3 of the angle formed by the approximate straight line L1 in the right region 410 and the approximate straight line L2 in the left region 420, and calculates an angle θ formed by a parallel straight line L4 that is parallel to the bisector L3 and passes through the car body center 100*a* and a center line L0 that passes through the car body center 100*a* and extends in the front and rear directions of the autonomous traveling device 100.

At step S207, the drive unit 130 is controlled by a turning/backward movement unit 117 to simultaneously execute a rotational movement to cause the autonomous traveling device 100 to rotate by the angle θ and a backward movement to cause the autonomous traveling device 100 to move backward, thereby causing the autonomous traveling device 100 to turn toward the parallel line L4. In other words, the turning/backward movement unit 117 corresponds to an example of a deviation control unit in the present invention, and causes the body unit 101 to move away from the obstacle 310 by combining the rotational movement that changes the orientation of the body unit 101 toward the intermediate direction of each of the directions calculated by the straight line calculation unit 115 and the backward movement that causes the body unit 101 to move backward. Furthermore, step S207 corresponds to an example of a deviation control step in the present invention.

By combining the backward movement and the rotational movement, the autonomous traveling device 100 can promptly move away from the obstacles and promptly return to autonomous traveling (recovery). Combinations of the backward movement and the rotational movement include, for example, an operation to move backward linearly after rotating on the spot by the angle θ, for example, and an operation to alternately repeat rotation on the spot and linear backward movement. In the present embodiment, however, the turning/backward movement unit 117 executes a turning movement that is a combination of the backward movement and the rotational movement. The turning movement makes it possible to move away from the obstacles in a shorter time compared to the operation in which the rotation on the spot and linear backward movement are performed separately. Furthermore, when the shape of the body unit 101 viewed from the top-and-bottom direction is a rectangle-liker shape, the turning movement is desirable because it allows recovery while avoiding temporary approach of the corners of the body unit 101 to the obstacle 310.

When the car body center 100*a* leaves the travel prohibited area 320 by the turning movement at step S207, the obstacle check processing is completed, and the processing returns to step S101 through "recovered" indicated in FIG. 7, where the autonomous traveling operation processing from the search for the traveling route is executed by the route search unit 111.

In a case of a situation where the obstacles 310 in the right region 410 and the obstacles 310 in the left region 420 are at an angle, such as in the vicinity of hollows in a wall, for example, as illustrated in FIG. 12, the recovery described above allows the autonomous traveling device 100 to head in the intermediate direction to be away from the obstacles 310 in both the right region 410 and the left region 420.

Figure 13:
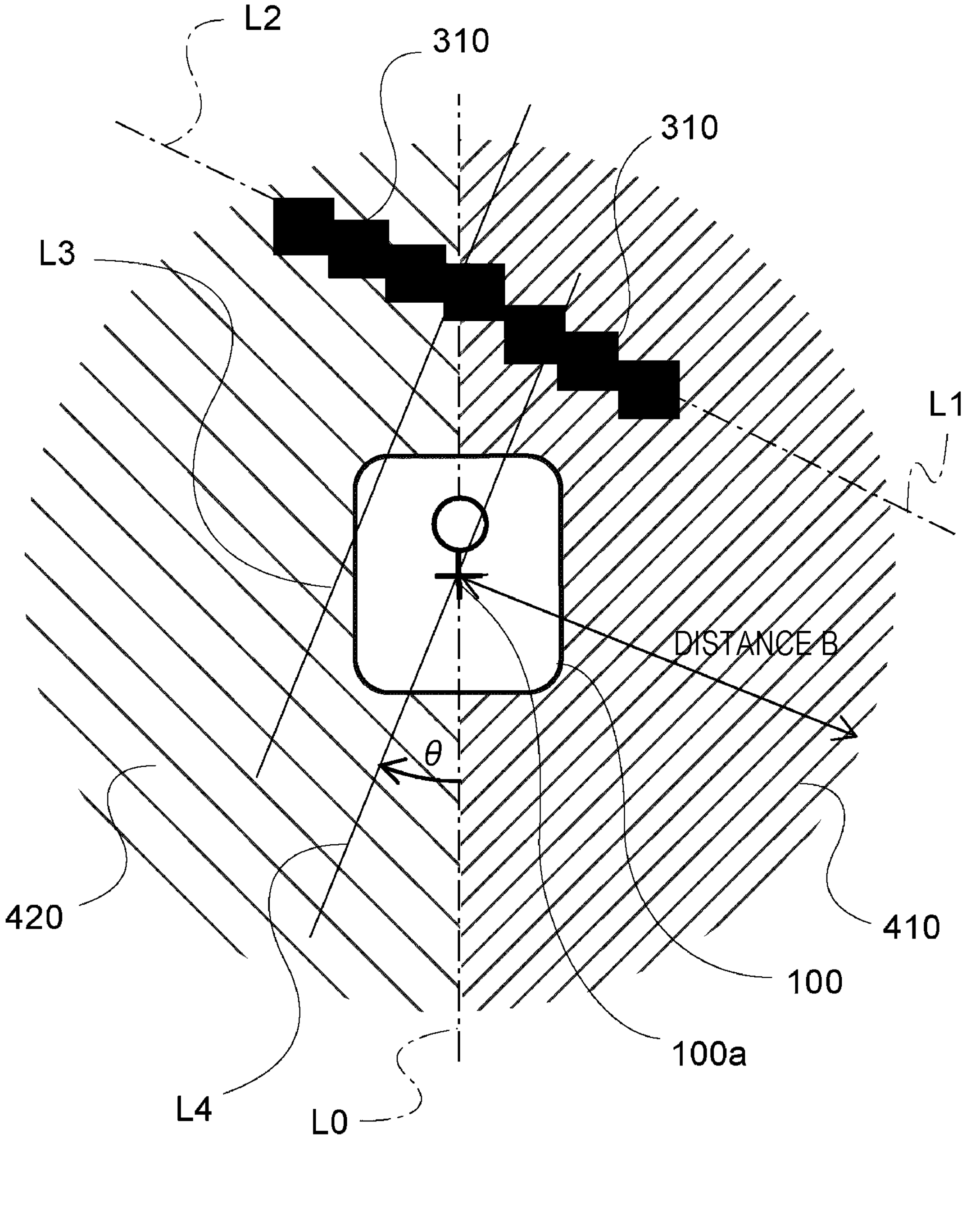
FIG. 13 is a diagram illustrating an example of recovery performed in the vicinity of linear obstacles.

FIG. 13 is a diagram illustrating an example of recovery performed in the vicinity of linear obstacles 310.

In the example illustrated in FIG. 13, the obstacles 310 extend linearly across the right region 410 and the left region 420. Therefore, the approximate straight line L1 of the obstacles 310 in the right region 410 and the approximate straight line L2 in the left region 420 coincide, and the bisector L3 is a straight line that perpendicularly intersects with the approximate lines L1 and L2. Therefore, the parallel straight line L4 passing through the car body center 100*a* of the autonomous traveling device 100 is also a straight line that perpendicularly intersects with the approximate lines L1 and L2, so that the autonomous traveling device 100 turns toward a direction perpendicularly moving away from the obstacles 310. In other words, in the example illustrated in FIG. 13, the autonomous traveling device 100 comes to head toward the direction perpendicularly moving away from the obstacles 310 such as a wall.

By the way, with the recognition of the obstacles 310 at step S204, the obstacles 310 may not be found in one of the right region 410 and the left region 420.

Figure 14:
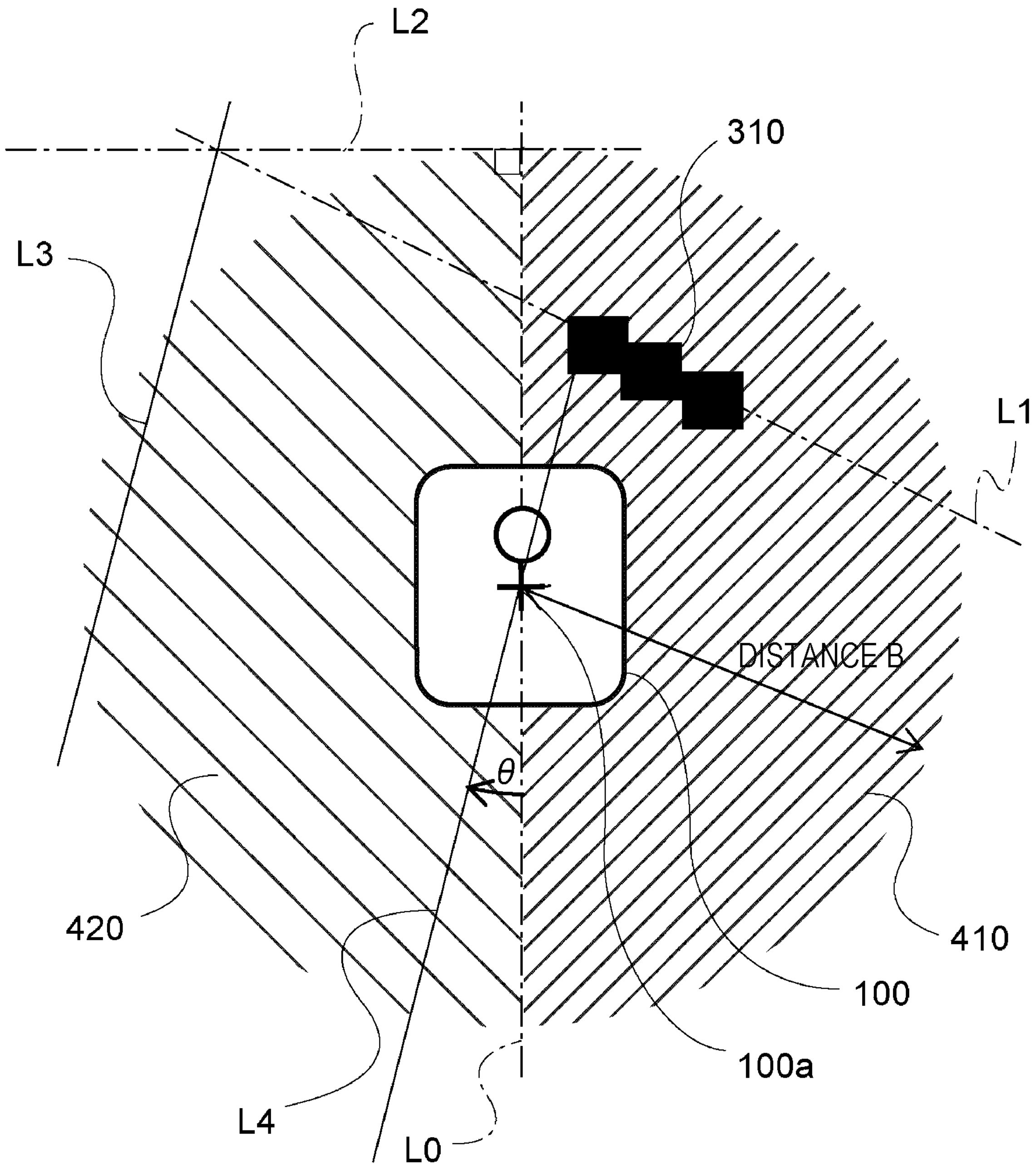
FIG. 14 is a diagram illustrating recovery performed when there are no obstacles found in a left region.

FIG. 14 is a diagram illustrating recovery performed when no obstacles 310 are found in the left region 420.

When there are no obstacles 310 found in the left region 420, for example, at step S204 of FIG. 11, the straight line calculation unit 115 at step S205 makes the approximate straight line L2 in the left region 420 a straight line perpendicular to the center line L0 of the autonomous traveling device 100. When no obstacles 310 are found, it is not known whether the obstacles 310 do not actually exist or actually-existing obstacles 310 are not able to be measured. Therefore, in the present embodiment, the approximate straight line L2 in the average direction when the obstacles 310 exist is set. In other words, when the obstacles 310 cannot be recognized for any one of the right and left regions (that is, the right region 410 and the left region 420) by the obstacle recognition unit 114, the straight line calculation unit 115 uses the true horizontal direction as the direction along the obstacle 310 in the region where no obstacles 310 are recognized.

As a result, the autonomous traveling device 100 comes to turn toward a safe direction to be away from both the measured obstacles 310 and the set approximate straight line L2, resulting in achieving a prompt recovery.

While AMR is mentioned herein as an example of application of the autonomous traveling device and the autonomous traveling device control method of the present invention, the application of the autonomous traveling device and the autonomous traveling device control method of the present invention is not limited to the above, and those can be used in a wide range, such as automatic guided vehicles (AGVs) and self-driving vehicles.

It is to be noted that the embodiment described above is to be considered exemplary and not restrictive in all respects. The scope of the present invention is indicated not by the embodiment described above but by the scope of the appended claims, and is intended to include all changes within the meaning and scope of the appended claims and their equivalents.

The invention claimed is:

1. An autonomous traveling device comprising:

a recognition unit that recognizes an obstacle for each of right and left regions sandwiching a body of the autonomous traveling device;

a direction calculation unit that calculates a straight line representing a direction along the obstacle for each of the right and left regions; and a deviation control unit that causes the body to move away from the obstacle by combining a rotational movement that changes orientation of the body toward an intermediate direction of each of the directions calculated by the direction calculation unit and a backward movement that causes the body to move backward.

2. The autonomous traveling device according to claim 1, wherein, when no obstacles are recognized by the recognition unit in any one of the right and left regions, the direction calculation unit uses a true horizontal direction as the straight line in the region where no obstacles are recognized.

3. The autonomous traveling device according to claim 1, wherein the recognition unit recognizes the obstacle by a sensor and also in map information.

4. The autonomous traveling device according to claim 1, wherein the deviation control unit executes a turning movement that is a combination of the backward movement and the rotational movement.

5. The autonomous traveling device according to claim 4, wherein a shape of the body when viewed from a top-and-bottom direction is a rectangle-like shape.

6. The autonomous traveling device according to claim 1, wherein the intermediate direction is defined by a bisector of an angle formed by the straight line in the right region and the straight line in the left region.

7. The autonomous traveling device according to claim 1, wherein the deviation control unit simultaneously executes the rotational movement and the backward movement.

8. The autonomous traveling device according to claim 1, wherein, when a plurality of obstacles are recognized in one of the right and left regions, the direction calculation unit calculates the straight line for an obstacle that is closest to the autonomous traveling device among the plurality of obstacles.

9. The autonomous traveling device according to claim 1, wherein the right and left regions are regions within a recognition distance from a body center of the autonomous traveling device.

10. An autonomous traveling device control method comprising:

a recognition step of recognizing an obstacle for each of right and left regions sandwiching a body of the autonomous traveling device;

a direction calculation step of calculating a straight line representing a direction along the obstacle for each of the right and left regions; and a deviation control step of causing the body to move away from the obstacle by combining a rotational movement that changes orientation of the body toward an intermediate direction of each of the directions calculated at the direction calculation step and a backward movement that causes the body to move backward.

11. The autonomous traveling device control method according to claim 10, wherein the intermediate direction is defined by a bisector of an angle formed by a straight line representing the direction along the obstacle in the right region and a straight line representing the direction along the obstacle in the left region.

12. The autonomous traveling device control method according to claim 10, wherein the deviation control step simultaneously executes the rotational movement and the backward movement.

13. The autonomous traveling device control method according to claim 10, wherein, when a plurality of obstacles are recognized in one of the right and left regions, the direction calculation step calculates the direction along the obstacle for an obstacle that is closest to the autonomous traveling device among the plurality of obstacles.

14. The autonomous traveling device control method according to claim 10, wherein the right and left regions are regions within a recognition distance from a body center of the autonomous traveling device.

* * * * *